3,025,204
BONDING HIGH TEMPERATURE RESISTANT MATERIALS WITH TUNGSTEN HEXAMETAPHOSPHATE
Edward A. Heintz, Williamsville, N.Y., assignor to Union Carbide Corporation, a corporation of New York
No Drawing. Filed Apr. 7, 1960, Ser. No. 20,538
5 Claims. (Cl. 156—89)

The present invention relates to a novel method of bonding heat-resistant materials.

Phosphates of several metals are known to possess some mechanical tenacity and cohesiveness to various degrees and are, therefore, being often employed as bonding agents in many industrial applications. For example, it is well known that nickel phosphate may be employed for painting resistant films on electrical insulating bases for the purpose of decreasing the moisture absorption in the base by virtue of the cohesive properties of the phosphate film.

This particular physical property of metal phosphates, however, has heretofore never been expanded to such a point as to render such phosphates usable as bonding agents capable of strongly bonding such articles as ceramics, quartz, metals, and similar substances.

It is, accordingly, an object of the present invention to provide a novel method of bonding materials such as ceramics, metals, and the like.

Other objects and advantages of this invention will be apparent from the subsequent disclosure and from the appended claims.

It has now been found that one specific phosphate of tungsten, namely, tungsten hexametaphosphate

[W(PO₃)₆]

may be utilized as a bonding material to provide a bond having particularly strong mechanical properties, that is, tenacity and cohesiveness even at elevated temperatures, which is superior to any other known tungsten phosphate and even more so to bonds formed from phosphates of other metals.

In accordance with the invention, heat-resistant materials may be strongly cemented by a novel method which comprises applying a layer of finely ground tungsten hexametaphosphate between adjoining surfaces to be bonded; heating the entire mass to a temperature at least sufficient to melt the tungsten hexametaphosphate, but preferably to temperatures approximating the melting point of the material to be bonded; and cooling the entire mass to allow the bonding material to solidify.

In order to lower the heating period and to substantially improve the uniformity of the cross-sectional cohesiveness of the bond, it is advantageous and preferable to employ tungsten hexametaphosphate in a fine state of comminution. Preferred particle sizes of the ground bonding agent are those passing through a 60 mesh screen (United States sieve series).

The thickness of the layer of tungsten hexametaphosphate necessary to obtain a satisfactorily strong physical bond is proportional to the surface porosity and superficial characteristics of the substances to be bonded, and also the size and weight of the articles to be bonded. Thus, for example, it was experimentally proven that when two porcelain articles are to be bonded together, a layer of tungstein hexametaphosphate of approximately ⅟₃₂ of an inch is required, while in the case of two polished steel plates, the layer of bonding agent necessary for an equally satisfactory bond does not need to be any thicker than about ⅟₆₄ of an inch.

The materials which can be bonded with tungsten hexametaphosphate must, however, be capable of withstanding at least the temperature necessary to melt the bonding agent, that is, approximately 400° C. Examples of materials which are known to resist this heating temperature and to be capable of being satisfactorily strongly bonded are porcelain, quartz, steel, aluminum, and many other metals and heat-resistant substances.

The heating operation of the invention may be carried out in any suitable vessel, furnace, heating plate, and the like, capable of generating temperatures of at least 400° C., and preferably of 1000° C., without the necessity of maintaining special inert atmospheres or of applying definite superatmospheric pressures. However, it should be understood that the absence of inert and/or special atmospheres and of pressures other than atmospheric do not constitute a limitation upon the type of heating means suitable for the process.

Temperatures greater than 400° C. may be employed if highly heat-resistant substances are used in the process. Generally, a heating period of from fifteen to thirty minutes has been found to be sufficient in most cases to create the desired strong bonding effect; however, the length of heating varies indirectly with the temperature adopted, that is, the higher the temperature the shorter the heating period.

It is preferred, however, to heat the bonding agent to temperatures of about 1000° C. because at such temperatures a uniform thickness of the bonding agent is obtained most quickly.

One preferred method of using tungsten hexametaphosphate comprises the preparation of a sandwich-type assembly by superimposing two or more articles to be bonded and interposing therebetween a layer of finely divided bonding agent, the thickness of such layer being, as mentioned above, proportional to the porosity and surface characteristics and to the size and weight of the materials to be bonded.

After the bonding agent has been melted and cooled, it has been found to possess, besides physical tenacity and cohesiveness, a certain degree of thermosetting ability. In fact, by reheating the bonding agent to elevated temperatures, it has been found that only at temperatures of about 1000° C. the bond begins to become soft and to lose its acquired tenacity. This thermosetting property indicates the obvious superiority of tungsten hexametaphosphate over other phosphate bonding agents, characterized by the ability of a bonded material to withstand elevated temperatures without damage to the bond.

A better understanding of this invention will be obtained from the following examples.

*Example I*

Two pieces of porcelain measuring approximately 1" x 1" x ⅛" thick were superimposed one on the other after depositing between their adjoining surfaces a layer about ⅟₃₂ of an inch thick of tungsten hexametaphosphate having an average particle size less than 60 mesh (United States sieve series). The sandwich thus formed was placed in a conventional laboratory muffle furnace and heated to approximately 1000° C. for twenty minutes at atmospheric pressure. After removal from the furnace and cooling to room temperature in air, the bond created by the melting of the tungsten hexametaphosphate was tested for tenacity and cohesiveness. It was found that the bond formed resisted repeated attempts to separate the bonded layers and that the newly cemented body ruptured at some other non-bonded location rather than in the area where the bonding agent was distributed.

*Example II*

Two small stainless steel plates measuring approximately 1" x 2" x ⅛" thick were superimposed one on the other after depositing between their adjoining surfaces a layer about 1/64 of an inch thick of tungsten hexametaphosphate having an average particle size less than 60 mesh (United States sieve series). The sandwich thus formed was placed in a conventional laboratory muffle furnace and heated to about 1000° C. for fifteen minutes at atmospheric pressure. After removal from the furnace and cooling to room temperature in air, the bond created by the melting of the tungsten hexametaphosphate was found to be so strong that rupture thereof occurred only after having placed the bonded body in a vise and having subjected it to repeated impacts by a sledge hammer.

What is claimed is:

1. A process of bonding ceramic, glassy, metallic, and like materials having a melting point greater than about 400° C., said process comprising comminuting tungsten hexametaphosphate to a fine particle size; distributing said comminuted tungsten hexametaphosphate between a plurality of adjacent and contiguous surfaces to be bonded; heating said tungsten hexametaphosphate and said surfaces to a temperature of at least 400° C., and below the melting point of the surfaces to be bonded so as to form a uniform melt of tungsten hexametaphosphate; and cooling the entire mass at least to the solidification temperature of the bonding material, thereby obtaining a strongly adhesive bond between said adjacent and contiguous surfaces.

2. The process in accordance with claim 1, in which the tungsten hexametaphosphate is comminuted to particle sizes less than 60 mesh (United States sieve series).

3. The process in accordance with claim 1, in which the tungsten hexametaphosphate is distributed between a plurality of adjoining and contiguous surfaces in layers having thicknesses of from about 1/64 of an inch to about 1/4 of an inch.

4. The process in accordance with claim 1 for bonding ceramic, glassy, metallic, and like materials having a melting point greater than about 1000° C., in which the tungsten hexametaphosphate and the adjoining and contiguous surfaces are heated to about 1000° C.

5. A process of bonding ceramic, glassy, metallic, and like materials having a melting point greater than about 1000° C., said process comprising comminuting tungsten hexametaphosphate to a particle size less than 60 mesh (United States sieve series); distributing said comminuted tungsten hexametaphosphate between a plurality of adjacent and contiguous surfaces in layers of from 1/64 to 1/4 of an inch thick; heating said tungsten hexametaphosphate and said surfaces to a temperature of about 1000° C., so as to form a uniform melt of tungsten hexametaphosphate; and cooling the entire mass at least to the solidification temperature of the bonding material, thereby obtaining a strongly adhesive bond between said adjacent and contiguous surfaces.

References Cited in the file of this patent
UNITED STATES PATENTS

| | | |
|---|---|---|
| 2,486,811 | Weyl | Nov. 1, 1949 |
| 2,518,194 | Silverman | Aug. 8, 1950 |